Dec. 17, 1929.   M. MARTENS   1,740,188

RESISTANCE MEASURING INSTRUMENT

Filed March 11, 1927

Inventor:
Moritz Martens
by Lowe, Kehlenbeck & Farley
Attorneys

Patented Dec. 17, 1929

1,740,188

UNITED STATES PATENT OFFICE

MORITZ MARTENS, OF BERLIN-SIEMENSSTADT, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

RESISTANCE-MEASURING INSTRUMENT

Application filed March 11, 1927, Serial No. 174,684, and in Germany March 20, 1926.

The present invention relates to resistance measuring instruments, more particularly insulation testers. Such instruments usually include a cross coil system which is disposed in a permanent magnetic field, one of the coils of the system being influenced by the voltage and the other by the current in the measuring circuit. Furthermore it has been proposed to replace the voltage coil of the cross coil system by two voltage coils rigidly secured to each other but traversed by the current in opposite directions. In this arrangement the two voltage coils with their winding surfaces are placed in radial direction behind each other in the same axial plane, namely in such a manner that one of the coils is situated in the direction of the axis itself. The iron core of the coils has an annular shape and is cut or recessed at the position which the pair of voltage coils assumes for infinite resistance.

The prior arrangement above referred to has for its object on the one hand to reduce to the greatest possible extent the torque of the voltage coils in the position for infinite resistance, in order to give the scale a wide division at the side of the high resistances; on the other hand, to eliminate the influence of outside fields on the voltage coils in this position in which its torque is the smallest, and thirdly, to ensure a large angle of deflection by the non-symmetrical position of the coils. This arrangement has however the drawback that the voltage coils are incompletely utilized, as the coil side which is situated in the line of the axis, does not produce any torque. Moreover, the eccentric mounting of the voltage coils necessitates a balance weight, that is to say an increase of the inertia, owing to which the rapidity of the setting is reduced.

The said drawbacks are avoided according to the present invention by arranging the two voltage coils one within the other instead of next to each other in the axial plane, and by making them of such a size that the inner one, like the current controlled coil, has an inside width or diameter which is but slightly greater than the diameter of the iron core.

Figure 1:
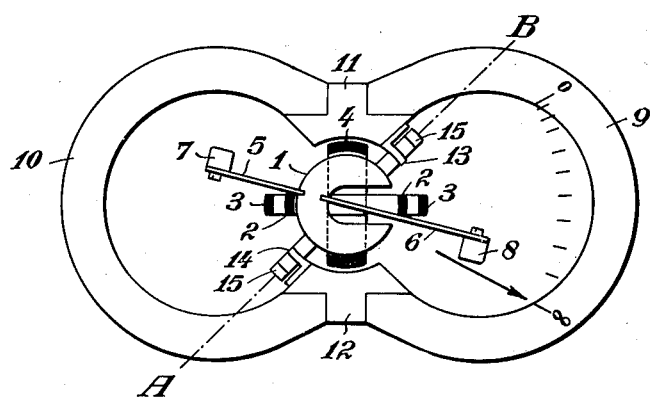
Figure 2:
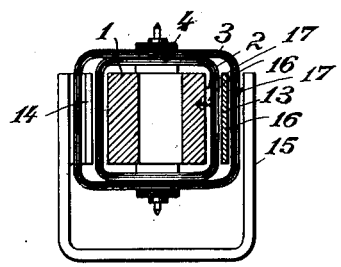

Figure 1 of the accompanying drawings shows by way of example a construction of the new instrument in a diagrammatic manner, and Fig. 2 is a partial section, substantially on the line A—B of Fig. 1. For the sake of clearness, all the coils are shown in section in Fig. 1. The iron core 1 is cut out or recessed at one side in the direction at right angles to the connection line of the poles, in a well known manner. In Figure 1 this is the right hand side. In the central plane which passes through this cut or recess, is situated the pair of the voltage coils 2 and 3 for the resistance "infinite". It is shown in the said position. The current coil 4 is secured in a well known manner to the pair of voltage coils.

The increase of the angle of deflection which had already been obtained with the well known non-symmetrical arrangement, is obtained here preferably by an already proposed method of securing the iron core. That is, the core 1 is supported by two thin plates 5 and 6. These plates are secured by screws to prisms 7 and 8 which in their turn are held in the frame of the measuring instrument. In order to eliminate the influence of outside magnetic forces for any value of the deflection, an already known magnet arrangement is preferably used. In this arrangement, the magnets 9 and 10 enclose with the pole pieces 11 and 12 the movable system in the directions which have to be considered as regards disturbances by outside fields. The fact that the total action of the coils 2 and 3 depends on the position of the pair of coils, is utilized for making the divisions narrower at the zero side of the resistance scale. This is necessary if it is desired with a given length of scale, to widen the division on the other half, towards the greater resistances, in the manner described. In order to make the division of the scale towards the zero end deflection as narrow as possible, the torque of the pair of coils, which acts in opposition to the torque of the current coil, must increase quickly with the increase of the deflection within the scale range in question. The total torque of the coils 2 and 3 must increase.

According to a further part of the invention, the action is rendered as great as possible first by turning the torques of the two coils, which at high resistances are in opposite directions, in the same direction towards the end deflection and secondly by strengthening the torques of the voltage coils by a suitable arrangement of the core. For these purposes I use the arrangement of the pole horns 13 and 14 as well as a magnetic shunt 15. The shape of this shunt is shown in Figure 2. In the same view are also shown the coils 2 and 3 in their end position. The poles of the magnetic shunt are arranged near the pole horns 13 and 14 at the side opposite the iron core. Consequently if the pole horn 13 is a north pole, lines of force will pass from it down to the left (see Figure 1) into the iron core, as well as upwards to the right into the shunt 15. In Figure 2 the lines of force are indicated by arrows 16. As moreover the currents of the two coils 2 and 3 are in opposite directions as indicated in Figure 2 by the arrows 17, the torques of the coils 2 and 3 will act in the same direction, that is to say will strengthen each other and increase quickly with the increase of the deflection, so that a great change of current in the coil 4 can produce only a small change of deflection. The conditions just explained obtain in the final or zero-resistance position of the apparatus, in which the coils 2, 3 lie substantially in the direction of the section line A—B of Fig. 1, that is, fully within the field of the magnetic shunt 15, and in the immediate vicinity of the pole horns 13 and 14. Fig. 2 indicates that in this position the pole horns actually project into the space between the two coils 2 and 3. In the initial or infinite-resistance position, however, (Fig. 1), the two coils 2 and 3 are intended to neutralize or oppose each other. For this purpose, the number of turns on each coil will be so selected that in the position last referred to, the torques of the two coils, through which the current is flowing in opposite directions, will balance or neutralize each other. As soon, however, as the coils move but slightly from such initial position, toward the position indicated by the line A—B, the two coils 2 and 3 will be exposed to magnetic fields of different strengths, so that their torques, while still opposite, will no longer be exactly equal. As the deflection increases, the torque of coil 3 will become less and less, reaching zero value at a certain point, and when the coils embrace the pole horns 13, 14, the torque of coil 3 will be in a direction reverse of the original direction, that is, at that time the torques of both coils 2 and 3 will be in the same direction and thus assist each other.

The distribution of flux emanating from the permanent magnets 9, 10 is modified by the pole horns 13, 14 and the shunt 15 in such manner that the direction of the lines of force upon one side of each pole horn is substantially opposed to that on the other side of such horn; in other words, the shunt strengthens the stray field of the pole horns. As has been stated above, the numbers of turns of the coils 2 and 3 are so selected or proportioned that in the infinite-resistance position their torques will just balance or neutralize each other. When this pair of coils 2, 3 begins to move away from the position just referred to, the outer coil 3 will enter more and more into the field created by the lines of force from the pole horns 13, 14 to the magnetic shunt 15, and from this there will result a corresponding reduction of the original torque of said coil 3. When this coil reaches the zero position indicated by the line A—B, such coil will be exposed fully and directly to the magnetic field directed from the pole horns 13, 14 to the magnetic shunt 15, and in this position the torque of said coil 3 will be opposite to the one it exerted in the infinite-resistance position. Therefore, in this extreme position (the zero position), the inner coil 2 and the outer coil 3 will exert torques in the same direction and of like effect, supplementing or assisting each other. The nature of the scale division is indicated in Figure 1. The arrangement in question could also be used in resistance measuring instruments for other purposes than insulation testing

What I claim as my invention and desire to secure by Letters Patent is:—

1. In a resistance measuring instrument the combination of a permanent field magnet, pole horns attached to said magnet, a current controlled coil and two voltage controlled coils with a recessed common iron core arranged to form a cross coil system, one of said voltage controlled coils mounted inside the other one with intermediate space, in such a manner that said pole horns get into the intermediate space near the end deflection, and a magnetic shunt, the poles of which are arranged near the said pole horns at the side away from said iron core.

2. In a resistance measuring instrument the combination of a closed permanent magnet having pole pieces at its inside, and a cross coil system movably disposed in the field of said magnet, said system including a current controlled coil and two voltage controlled coils rigidly secured thereto, one of said last-named coils mounted inside the other one and said last-named coils being adapted to produce such torques in the position for infinite resistance as will nearly cancel each other.

3. In a resistance measuring instrument the combination of a closed permanent magnet having pole pieces at its inside and pole horns thereon, a current controlled coil and two voltage controlled coils with a recessed common iron core arranged to form a cross coil system, one of said voltage controlled coils mounted inside the other one with intermediate space, in such a manner that said pole horns get into the intermediate space near the end deflection.

4. In a resistance measuring instrument the combination of a closed permanent magnet having pole pieces at its inside and a cross coil system movably disposed in the field of said magnet, said system including a current controlled coil and two voltage controlled coils rigidly secured thereto, one of said last-named coils mounted inside the other one and said last-named coils being adapted to produce such torques in the position for infinite resistance as will nearly cancel each other, a common iron core having a cut in the direction at right angles to the line connecting said pole pieces, thin plates for supporting said iron core and a magnetic shunt, the poles of which are arranged near said pole pieces.

5. In a resistance measuring instrument the combination of a closed permanent magnet having pole pieces at its inside, and pole horns on said pole pieces, a cross coil system movably disposed in the field of said magnet, said system including a current controlled coil and two voltage controlled coils rigidly secured thereto, one of said last-named coils mounted inside the other one and said last-named coils being adapted to produce such torques in the position for infinite resistance as will nearly cancel each other, a common iron core having a cut in the direction at right angles to the line connecting said pole pieces, thin plates for supporting said iron core and a magnetic shunt, the poles of which are arranged near said pole horns at the side away from said core.

In testimony whereof I affix my signature.

MORITZ MARTENS.